US012718964B2

(12) United States Patent
Capogni et al.

(10) Patent No.: US 12,718,964 B2
(45) Date of Patent: Aug. 25, 2026

(54) FAST-NEUTRON FLUX RADIATING DEVICE WITH AN IMPROVED SUPPORT FOR A TARGET OF RADIATIONS AND RADIATING METHOD THEREOF

(71) Applicant: ENEA—AGENZIA NAZIONALE PER LE NUOVE TECNOLOGIE, L'ENERGIA E LO SVILUPPO ECONOMICO SOSTENIBILE, Rome (IT)

(72) Inventors: Marco Capogni, Rome (IT); Pietro Agostini, Rome (IT)

(73) Assignee: ENEA—AGENZIA NAZIONALE PER LE NUOVE TECNOLOGIE, L'ENERGIA E LO SVILUPPO ECONOMICO SOSTENIBILE, Rome (IT)

( * ) Notice: Subject to any disclaimer, the term of this patent is extended or adjusted under 35 U.S.C. 154(b) by 681 days.

(21) Appl. No.: 17/912,367

(22) PCT Filed: Mar. 18, 2021

(86) PCT No.: PCT/IB2021/052286
§ 371 (c)(1),
(2) Date: Sep. 16, 2022

(87) PCT Pub. No.: WO2021/186391
PCT Pub. Date: Sep. 23, 2021

(65) Prior Publication Data
US 2023/0187089 A1 Jun. 15, 2023

(30) Foreign Application Priority Data
Mar. 18, 2020 (IT) ........................ 102020000005815

(51) Int. Cl.
*G21G 1/06* (2006.01)
*G21K 5/08* (2006.01)

(52) U.S. Cl.
CPC ................ *G21G 1/06* (2013.01); *G21K 5/08* (2013.01)

(58) Field of Classification Search
CPC ............. G21G 1/06; G21G 2001/0042; G21G 2001/0094; G21K 5/08
(Continued)

(56) References Cited

U.S. PATENT DOCUMENTS 5,392,319 A * 2/1995 Eggers ..................... H05H 3/06 376/151
5,870,447 A 2/1999 Powell et al.
(Continued)

FOREIGN PATENT DOCUMENTS

JP 2002214395 7/2002
WO 9859347 12/1998
(Continued)

*Primary Examiner* — Jinney Kil
(74) *Attorney, Agent, or Firm* — Bayramoglu Law Offices LLC

(57) ABSTRACT

Radiating device (1) comprising at least one vacuum chamber (2), an electrostatic accelerator or laser of high power and high frequency (5) for producing at least one primary beam inside the vacuum chamber (2), and an active material layer (4) carried by a support (3) into the vacuum chamber (2) to generate an intense neutron flux when the active layer is struck by the primary beam, and at least one target (6) comprising a material, with the target (6) disposed on the same side of the electrostatic accelerator or power laser (5) as the active material layer (4).

12 Claims, 2 Drawing Sheets

(58) Field of Classification Search
USPC .......................................... 376/158, 186, 202
See application file for complete search history.

(56) References Cited

U.S. PATENT DOCUMENTS

| | | | | |
|---|---|---|---|---|
| 2010/0215137 | A1* | 8/2010 | Nagai | G21G 1/06 376/158 |
| 2013/0142296 | A1 | 6/2013 | Piefer et al. | |
| 2015/0179290 | A1 | 6/2015 | Clayton | |
| 2019/0103198 | A1* | 4/2019 | Nolen, Jr. | G21K 5/08 |
| 2022/0304135 | A1* | 9/2022 | Ghetta | H05H 3/06 |

FOREIGN PATENT DOCUMENTS

| | | |
|---|---|---|
| WO | 2016022848 | 2/2016 |
| WO | 2017076961 | 5/2017 |

* cited by examiner

FAST-NEUTRON FLUX RADIATING DEVICE WITH AN IMPROVED SUPPORT FOR A TARGET OF RADIATIONS AND RADIATING METHOD THEREOF

This application is a national phase application claiming benefit of priority under 35 U.S.C. § 371 to Patent Convention Treaty (PCT) International Application serial number PCT/IB2021/052286, filed Mar. 18, 2021, now pending, which claims the benefit of priority to Italian patent No. 102020000005815, Mar. 18, 2020. The aforementioned applications are expressly incorporated herein by reference in their entirety and for all purposes.

TECHNICAL FIELD

The present invention relates to a fast-neutron flux radiating device for producing radioactive isotopes, for example metastable technetium-99 (Tc-99m), for nuclear medicine applications.

STATE OF THE ART

It is known to irradiate a target, containing material to be activated, by a fast neutron flux in order to obtain radioactive isotopes that, after further treatment, are used in nuclear medicine devices. For example, starting from a natural molybdenum target, containing a percentage of molybdenum-100 (Mo-100), it is possible to obtain molybdenum-99 (Mo-99), from which we have Tc-99m, after irradiation of fast neutrons (of energy about 14 MeV) inside a vacuum chamber.

There is a need to increase the productivity of this process which, at present, has a very low yield under normal fast neutron irradiation conditions, and requires high energy facilities to produce such neutrons.

PURPOSES AND SUMMARY OF THE INVENTION

The purpose of the present invention is to provide an improved radiating device capable of satisfying the above specified need.

The purpose of the present invention is achieved by a radiating device comprising: 1) an electrostatic accelerator for ions (D+ deuterons and/or T+ tritons) or a laser, such as to constitute a high-energy primary beam;

2) a vacuum chamber, in which the primary beam preferably also travels in parallel mode, comprising:

(a) an active material layer on a defined and suitable support, arranged e.g. orthogonally to the direction of the primary beam and capable of generating, when struck by said beam, an intense flux of fast neutrons, e.g. of energy 2.45 MeV or 14.1 MeV;

(b) a target comprising a material to be irradiated arranged on the same side of origin of said beam as the active material layer.

According to this configuration, in the half-space of origin of the beam, the mostly spherical propagation, except for slight asymmetries, of little importance for the production of neutrons and due to reasons of the physics of the reaction, of the neutron flux directly hits the target and this makes the nuclear production reaction in the target of the radioactive isotope particularly effective. Being in a vacuum chamber, the target can be placed at a variable distance from the active material layer but, in order to collect the greatest number of neutrons emitted in the half-space of origin of the primary beam, it is necessary, in the hypothesis of a hemispherical geometry of the target, that the center of the hemisphere, of radius R, is as close as possible to the active layer, compatibly with the dimensions of the materials that constitute it, and the useful surface of this hemisphere is equal to $2\pi R^2$ minus the surface of the hole necessary for the passage of the primary beam. The choice of the dimensions of R must be such as to maximize the activity produced in the target. Therefore, for the same size of the target, the yield is maximum when the distance of the target from the active layer is minimum.

According to an embodiment of the present invention, the target comprises a cavity, preferably a through hole and is arranged such that, in use, the primary beam passes through the cavity and reaches the active layer unobstructed. Preferably, the target is further defined by two concavities having a first and second curvature so as to identify a hemispherical shell and, in use, the target is arranged such that the neutrons are in a direction radial to said surface short of the through hole through which the neutrons continue their path without being intercepted.

In this way, the spherically produced and propagating neutrons uniformly intercept the largest amount of target, increasing the throughput of the entire facility. The target can also take shapes other than the hemispherical shell shape described, which is suitable for uniform exposure using the smallest mass of target material. In particular, all those shapes can be used, such as the perforated plate or the perforated cylinder, which, provided with a through hole, can be arranged close to the active surface, in order to intercept the emitted neutrons in a solid angle of opening close to that of the hemisphere ($2\pi$). Further, the primary beam is preferably perpendicular to a tangent of the active layer in a plane containing the beam so as to radiate the target symmetrically. Preferably, the active layer is flat but may also assume a wavy configuration suitable to increase the exposed surface area and consequently reduce the heat flux to which it is subjected.

According to a preferred embodiment, the support is movable and the active material layer is applied to the support along a path such that, while the support is in motion, the primary beam intercepts a portion of the active material layer to generate the neutron flux.

By means of the preferably rotary movement of the support, adjacent portions of the active material layer are struck in succession by the primary beam. Since the impact with the beam generates a considerable amount of heat, the motion of the support, during the operation of the device (accelerator or laser) that generates the primary beam, allows the support portions already hit by the primary beam to gradually exit the action range of the latter allowing the heat to be disposed of by conduction and radiation.

According to a preferred embodiment of the present invention, the radiating device includes a cooling circuit configured to remove heat from the support and arranged so that the target and the primary beam are on the same side with respect to the plane identified by the active layer so that the neutron flux does not pass through the water of the cooling circuit while reaching the target.

The cooling circuit, for significant powers, is always present, either in combination with the mobile support or in the presence of fixed support. The fact that the secondary neutron flux does not pass through the cooling circuit but passes through an empty half-space while reaching the target, considerably increases the yield of the radiating device. It should be noted that it is also possible to arrange an additional target on the opposite side of the primary beam from the active layer. However, this additional target is affected by neutrons with reduced intensity and energy as a result of passing through the cooling circuit, e.g., water in copper tubes.

In addition, the temperature control allows the fusion reaction that produces the fast neutrons to take place properly.

According to a preferred embodiment of the present invention, the device comprises a further electrostatic accelerator or laser, a further active material layer applied to the substrate and a further target, preferably arranged on opposite sides of said accelerator or laser, active layer and target already mentioned with respect to a plane passing through said support, said further accelerator or laser being configured to generate a further primary beam of energy to strike the further layer of active material and generate a further flux of fast neutrons for the further target.

The configuration of keeping target and primary beam on the same side with respect to the active material layer compactly allows efficient use of the produced neutrons without degrading in energy and intensity, compatibly with the performance of the support cooling system.

According to a preferred embodiment of the present invention, the active material layer comprises tritium (in the case of a D+ electrostatic deuteron accelerator), or a mixture of tritium and deuterium (in the case of a laser beam), and the target comprises molybdenum-100 (Mo-100).

This allows metastable technetium-99 (Tc-99m) to be obtained for applications in nuclear medicine imaging devices such as SPECT (Single Photon Emission Computed Tomography).

Other advantages of the present invention are discussed in the description and cited in the dependent claims.

BRIEF DESCRIPTION OF THE DRAWINGS

The invention is described below on the basis of non-limiting examples illustrated by way of example in the following figures, which refer respectively to.

DETAILED DESCRIPTION OF THE INVENTION

The present invention relates to the positioning, relative to a source of fast, quasi-monochromatic neutrons e.g. of energy about 14.1 MeV, and the specific geometrical configuration of a target to be subjected to neutron irradiation to obtain high neutron fluxes under effective conditions, i.e., with the right energy and not degraded in intensity and, consequently, allowing for high yields of the produced activity. According to an embodiment example, neutrons are obtained from the reaction $^{3}H(d,n)^{4}He$ (D-T), but can also be extended to fast neutrons of energy 2.45 MeV obtained from the reaction $^{2}H(d,n)^{3}H$ (D-D) or fast neutrons of energy 13.36 MeV obtained from reaction $^{2}H(^{7}Li,n)^{8}Be$ (D-Li) or fast neutrons that have a continuous energy spectrum and can be used for material activation or other applications. The present invention applies to the general field of irradiation of a target by a neutron flux and, based on the energy of the neutrons, the applications of the irradiated target are varied. For example, when the energy is a little over 10 MeV the application of the target is also in the field of nuclear medicine and when the energy is a few, e.g. 2.45, MeV, there may be various applications in laboratories for the study of irradiated materials for both basic and applied sciences.

Figure 1:
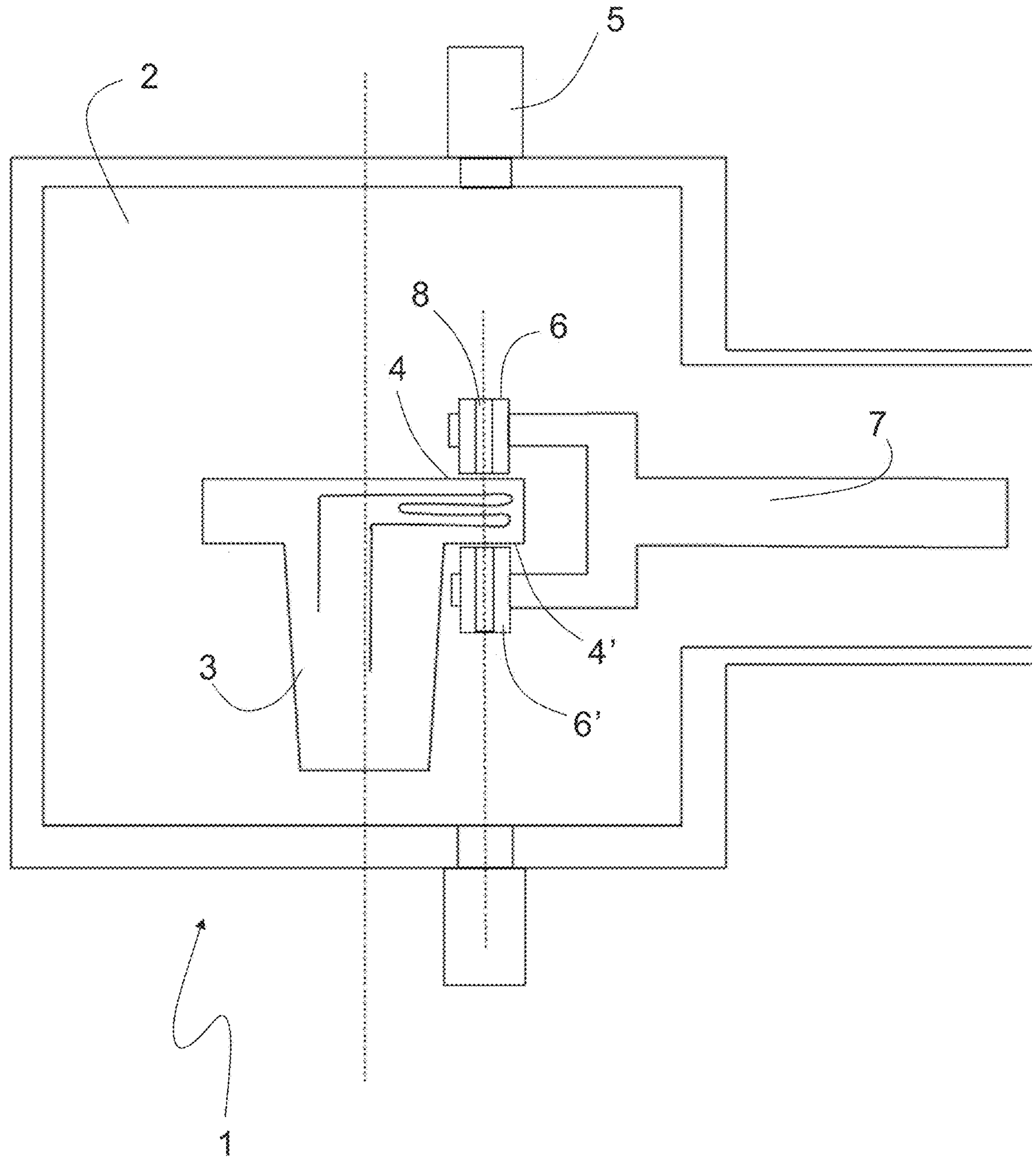
FIG. 1 a schematic view of a radiating device according to the present invention.
Figure 2:
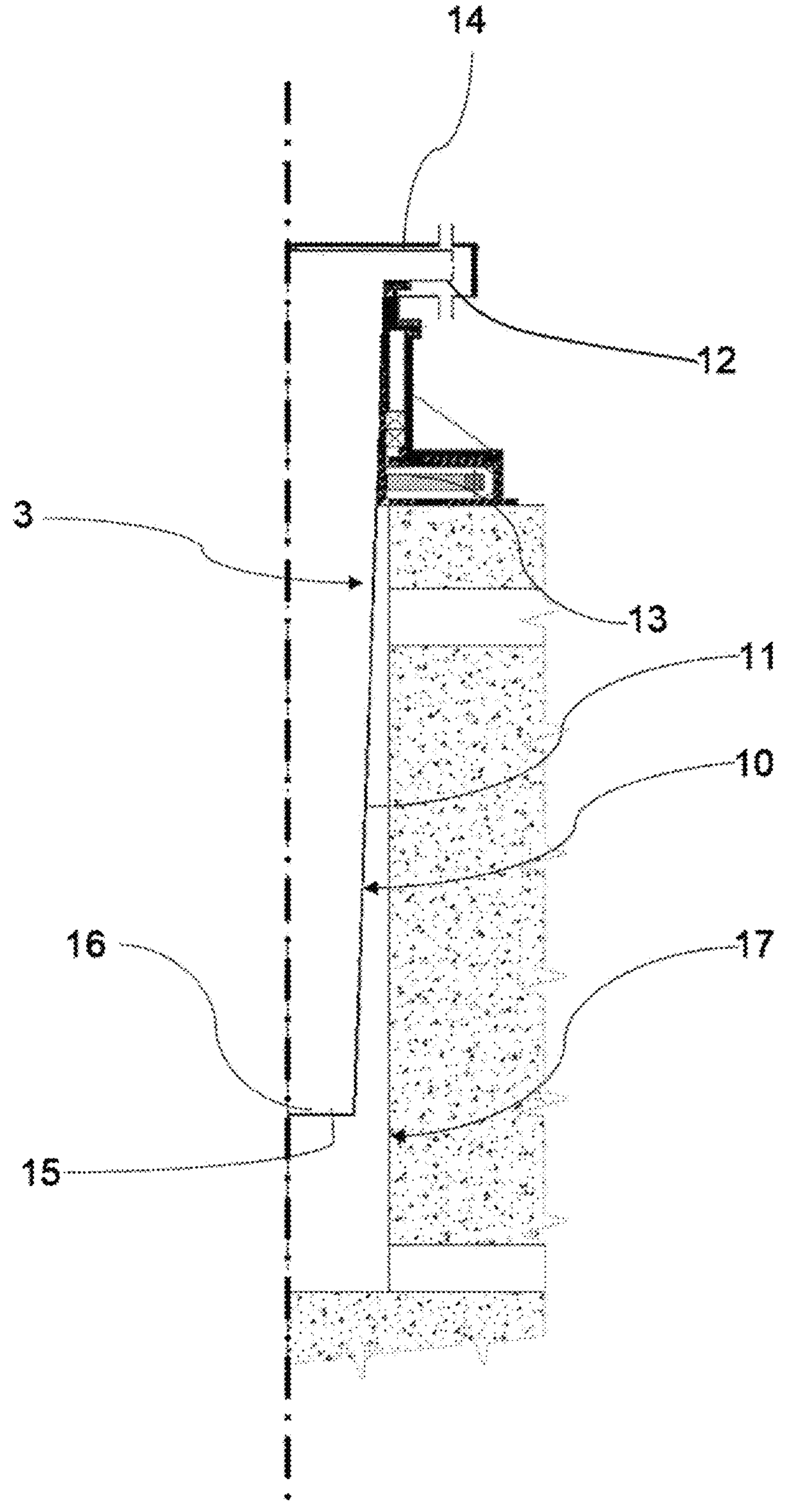
FIG. 2 is a schematic section of a preferred embodiment of an element of FIG. 1.

According to the preferred example in FIG. 1, the radiating device 1 of the present invention comprises a vacuum chamber 2, with pressure inside between $10^{-5}$ and $10^{-9}$ bar, a rotatable and cooled support 3 inside the vacuum chamber 2, an active material layer 4, e.g. Tritium adsorbed on a support, and at least one electrostatic accelerator 5 or laser of sufficient power to constitute a high-energy primary beam, in use, the accelerated ions define a high-energy primary beam that intercepts the active material layer 4 so as to generate a neutron flux that propagates spherically, i.e. equiprobably over the entire solid angle. The device 1 further comprises a target 6 comprising a material to be irradiated, e.g. Molybdenum 100, held by a sample holder 7 at a position facing the active material layer 4. Preferably, the target 6 is shaped taking into account area and profile of the primary beam normal section as well as the size of the vacuum chamber, so as to maximize the fraction of neutrons that can be intercepted. As an example, a cylindrically shaped target 6 having height H and internal hole of radius R, collects the fraction, f, of secondary beam approximately equal to $f=(2*\pi*H*R-\pi*R2)/(4*\pi*H2)$. For appropriate values of H and R (with $H>2*R$), the fraction therefore of intercepted neutrons approaches 50% of the total available neutrons.

According to the invention, the target 6 is arranged in the half-space from which the charged particle beam or laser beam (primary beam) originates, but without interfering with the same. There are numerous possible configurations in terms of arrangements and geometries that can be used. In any case, the target 6 defines a central hole to allow the passage of the accelerated charged particle beam (primary beam) directed towards the active material layer 4. In addition, the target 6 defines a hollow i.e. concave surface exposed to the neutron source, in order to uniformly collect as many neutrons emitted from the active material layer as possible, limiting dispersions. With these prescriptions, the simplest form for the target 6 is that of a cylinder coaxial with the direction of the primary beam, having a through hole 8 of adequate area to allow the passage of the beam itself without obstruction. However, one cannot exclude, e.g., hemi-spherical and/or hemi-toroidal geometries, which may increase the fraction of neutrons intercepted by the target 6 approaching the value of 50% of the entire neutron flux produced, i.e., neutrons are released both towards the target 6 and towards the support 3 and neutrons that are directed in the latter direction quickly lose energy due to obstacles encountered, e.g., the support itself, the cooling circuit etc. Therefore, the value of 50% is a limiting value that, due to the through-hole of the target, will never be reached.

In use, the accelerated beam of charged particles (primary beam), consisting of deuterons (D+), directed toward the active material layer 4 on which tritium (T) is implanted, crosses, without being disturbed, the target 6 located near to layer 4. The D-T reaction produces neutrons at about 14 MeV energy. The use of Lithium-7 on the active layer involves, instead, D-Li7 reactions with production of neutrons from 13.36 MeV energy starting from a material, i.e. Li, not radioactive and therefore easier to treat especially in plants intended for the production of radioisotopes for nuclear medicine and not used in research on nuclear fusion. The use of Deuterium implanted on the active layer involves D-D reactions with neutron production from 2.45 MeV. The target 6, which can e.g. also have a concave shell shape with a through-hole, with an axis coincident with the direction of the accelerated deuteron beam. By means of the sample holder 7 an operator can replace the material to be irradiated at the end of the operation. The target 6 is preferably positioned as close to the layer 4 as possible but, in the case of a rotating support 3, without hindering the rotation that is necessary in high power systems to dissipate thermal energy.

In the half-space opposite to that of origin of the primary beam, with respect to the active surface, it is possible, compatibly with the encumbrance materials used to cool the same, to place, always in the vacuum chamber 2, an additional target 6'. In this way the conditions are realized for which the neutrons, emitted at $4\pi$ in the nuclear fusion reaction, D-T, D-7Li, or D-D, which takes place on the active surface, are used in the maximum condition of geometric efficiency. Finally, it becomes clear that modifications or variations can be made to the fast neutron radiating device described and illustrated herein without departing from the scope of protection as defined by the appended claims.

It is possible to make targets of various materials, such as copper-natural or even better zinc-natural on which to induce reactions such as Cu-65(n,2n)Cu-64 or Zn-64(n,p) Cu-64 for the production of copper-64 (Cu-64) which is a radioisotope theranostic. It should be noted that Zn-64 is widespread and obtainable commercially in discrete quantities since, for example, it can be obtained from natural zinc, in which it is present in percentages close to 50%. By means of the present invention, it is possible to process quantities of a few kilograms e.g. 10 kg, in order to obtain a production of radioisotopes e.g. for radiotherapeutic use capable of satisfying the growing market related to the development of nuclear medicine.

The advantage of using neutrons at 14 MeV to produce Cu-64, which is also produced with cyclotrons (reactions n, p on nickel-64), is that you do not have to use nickel that is very expensive and has an extremely localized extraction and production and therefore subject to constraints.

For example, even indium-111 (In-111), which is another radioisotope used in nuclear medicine, can be obtained from a generator of tin-111 (Sn-111) in turn produced by reaction Sn-112(n,2n)Sn-111 with neutrons at 14 MeV. In this case, as is the case for Mo-99/Tc-99m, the presence of the generator allows the radioisotope of interest (In-111) to be used far from the production center.

The target 6 may have additional shapes with a cavity arranged to allow the primary energy beam to reach the active layer 4. For example, the target may have a U-shaped cross-section, despite the fact that in this case the yield is lower than having a through-hole that is closed in the circumferential direction. The fusion reaction and the energy beam that initiates it generate a large amount of heat and, particularly when multiple primary beams are present, a cooling assembly of the radiating device 1 includes an on-board cooling fluid carried by the support 3 and a second cooling fluid in heat exchange with the first cooling fluid through the walls of the support 3.

For example, the support 3 is hollow and sealed. The support also has a central body 10 with inclined walls 11 and a flange 12 protruding from the inclined walls and on which the active layer 4 is disposed. When the support 3 is rotated by a motor, e.g., a rotary motor driving a gearing pinion in a gear wheel 13 attached to the support 3, the coolant rises by the action of centrifugal force along the inclined walls toward the flange 12.

Thus, the primary energy beam initiates the nuclear fusion reaction.

Once this reaction is initiated, the thermal power released on the active layer 4 causes the first phase change of the first cooling fluid and the first fluid, preferably water, evaporates. In particular, the vapor and the still-liquid refrigerant generate a pressure gradient between a head 14 of the support 3, toward which the side walls 11 diverge and where the flange is located, and a bottom 15 of the support 3.

Then, the pressure difference moves the generated vapor toward the bottom 15, causing the second phase change, i.e., condensation of the vapor. In particular, the vapor, by impacting on the side surface 11 and preferably on a base 16, accomplishes the second phase change. In more detail, the vapor, by condensation, exchanges heat with the second coolant maintained at a lower temperature.

After the second phase change, the first coolant fluid migrates back to the head flange 12 driven by the centrifugal force due to the rotation of the support 3. Advantageously, the perfectly sealed hollow support 3 allows for replacement of the hollow support itself, if necessary, avoiding leakage to the external environment of radioactive products possibly contained in the first fluid. In particular, in the case where the first coolant fluid is water, the sealed hollow support 3 prevents leakage of tritium water produced during operation of the device 1.

The central body 10 is immersed at least partially in a tank 17 within which the second fluid cools the first fluid. The vacuum chamber 2 may contain all or a large part of the central body 10 or, by means of suitable seals, contain only the part of the support 3 on which the active layer 4 and the target 6 are located.

The invention claimed is:

1. A radiating device for producing radioisotopes, the radiating device comprising:

at least one vacuum chamber, a first generator configured to produce a first primary energy beam, said first primary energy beam being inside the at least one vacuum chamber, and an active material layer disposed on a support and configured to realize a nuclear fusion reaction, wherein said active material layer and said support are in the at least one vacuum chamber, wherein the radiating device is configured such that the first primary energy beam is directed to the active material layer to activate the nuclear fusion reaction and generate a neutron flux, and at least one target, wherein the radiating device is configured such that a material included in the at least one target is irradiated by the neutron flux in the at least one vacuum chamber, wherein the radiating device is configured such that the at least one target is disposed between the active material layer and the first generator, the active material layer is disposed between the at least one target and the support, and the at least one target comprises a through-hole through which the first primary energy beam passes prior to reaching the active material layer, wherein the at least one target is a cylinder and wherein the through-hole passes through an entirety of a length of the cylinder.

2. The radiating device of claim 1, wherein the support is configured to be movable and the active material layer is disposed on the support such that, while the support is in motion, the first primary energy beam is directed to a portion of the active material layer to generate the neutron flux.

3. The radiating device of claim 1, further comprising a cooling circuit configured to remove heat from the support and arranged so that the neutron flux does not pass through the circuit as it reaches the at least one target.

4. The radiating device of claim 3, further comprising:
- a second generator of a second primary energy beam,
- a further active material layer applied on the support, and
- a further target that is different from the at least one target,
- said second generator of the second primary energy beam being configured to generate the second primary energy beam such that the second primary energy beam hits the further active material layer to generate a flow of neutrons for the further target.

5. The radiating device of claim 4, wherein the active material layer comprises Tritium or Lithium and the at least one target or the further target comprises one of molybdenum-100, copper-65, zinc-64 or tin-112.

6. The radiating device of claim 4, wherein the further target is arranged on a first side of a plane passing through said support, and said first generator, the active material layer and the at least one target are arranged on a second side of the plane passing through said support that opposes said first side of the plane passing through said support.

7. The radiating device of claim 1, wherein the active material layer is arranged orthogonally to a direction of the first primary energy beam.

8. The radiating device of claim 1, wherein the cylinder is coaxial with a direction of the first primary energy beam, said through-hole having a cross-sectional area configured to allow passage of the first primary energy beam to the active material layer without obstruction.

9. The radiating device of claim 1, wherein the at least one target comprises copper or zinc.

10. The radiating device of claim 1, wherein said through-hole has an axis coincident with a direction of the first primary energy beam and wherein the first primary energy beam is an accelerated deuteron beam.

11. The radiating device of claim 1, further comprising an additional target in the at least one vacuum chamber, wherein the additional target is different from the at least one target.

12. A radiating device for producing radioisotopes, the radiating device comprising:
- at least one vacuum chamber,
- a first generator configured to produce a first primary energy beam, said first primary energy beam being inside the at least one vacuum chamber, and
- an active material layer disposed on a support and configured to realize a nuclear fusion reaction, wherein said active material layer and said support are in the at least one vacuum chamber, wherein the radiating device is configured such that the first primary energy beam is directed to the active material layer to activate the nuclear fusion reaction and generate a neutron flux, and
- at least one target, wherein the radiating device is configured such that a material included in the at least one target is irradiated by the neutron flux in the at least one vacuum chamber,
- wherein the radiating device is configured such that the at least one target is disposed between the active material layer and the first generator, the active material layer is disposed between the at least one target and the support, and the at least one target comprises a through-hole through which the first primary energy beam passes prior to reaching the active material layer,
- wherein the support is configured to be movable and the active material layer is disposed on the support such that, while the support is in motion, the first primary energy beam is directed to a portion of the active material layer to generate the neutron flux,
- wherein the support includes a head flange on which the active material layer is disposed and wherein the support is hollow and rotatable and comprises a central body with inclined side walls diverging towards the head flange, and wherein the cooling circuit comprises a first cooling fluid and a second cooling fluid, wherein the first cooling fluid is sealed inside the support such that the head flange is reachable by the first cooling fluid, and the second cooling fluid is disposed outside of the support and is in heat exchange with the first cooling fluid through the inclined side walls.

* * * * *